Patented Sept. 10, 1929.

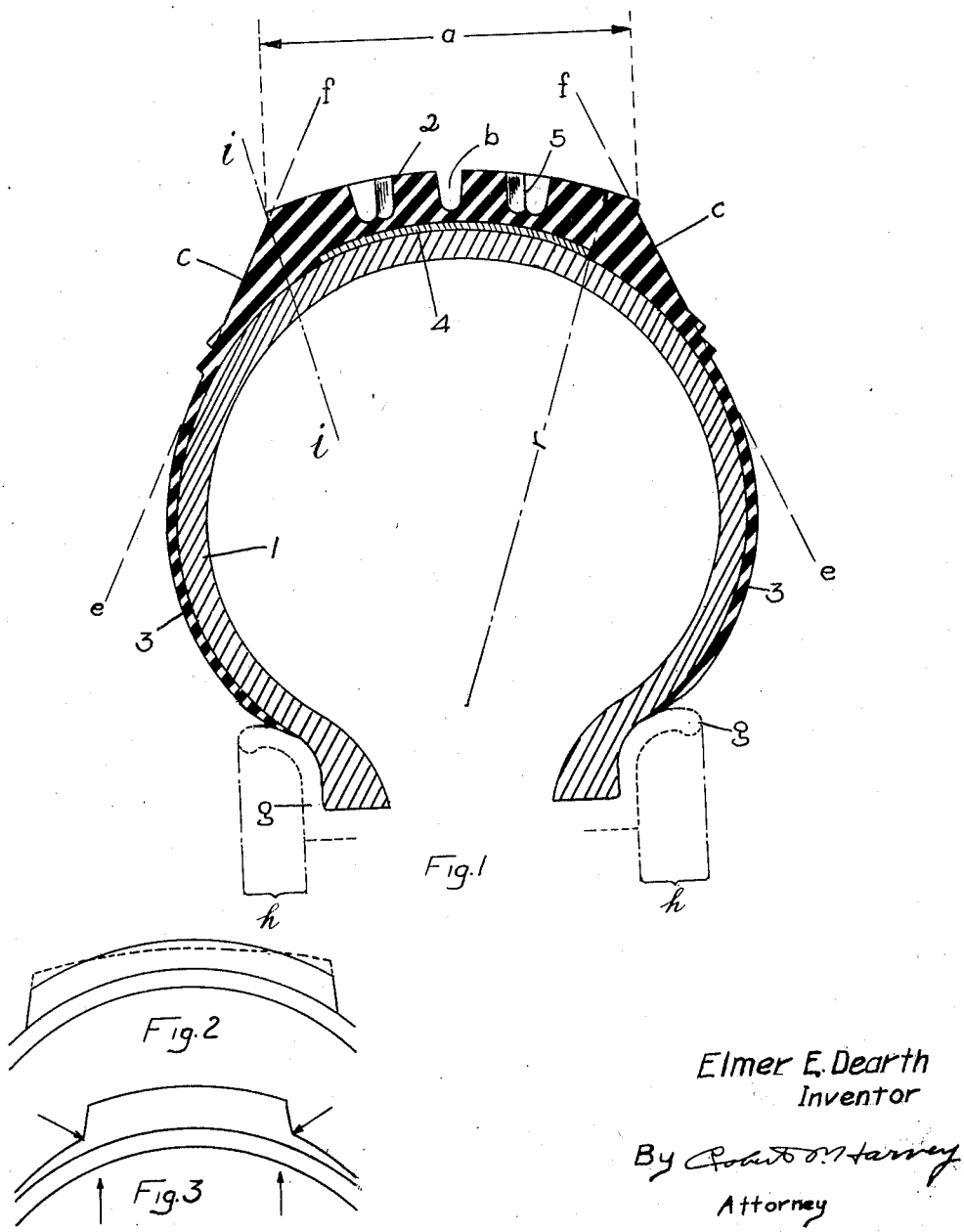

1,727,537

UNITED STATES PATENT OFFICE.

ELMER E. DEARTH, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TIRE CONSTRUCTION.

Application filed January 29, 1926. Serial No. 84,609.

My invention relates to pneumatic tire casings of the so-called balloon or low pressure type.

It has for its object a construction in which the tread wear will be uniform and in which the load stresses will be so transmitted and distributed to the carcass or absorbed by the tread as to substantially lengthen the useful life of the casing.

In the accompanying drawings which illustrate one embodiment of my invention together with part of the prior art, Figure 1 is a section of a casing embodying my invention, Figure 2 is a diagrammatic section showing one type of prior construction and Figure 3 is a similar disclosure of another type of prior construction.

Low pressure tire constructions following prior practice may be divided into three groups as follows, those having wide round treads, those having wide flat treads and those having narrow treads. In Figure 2 I illustrate the wide round tread in full line and the wide flat tread in dotted line. Both of these types of tread wear unevenly in service, shortening the useful life of the casing. In Figure 3 I have illustrated the third type of prior construction namely a tread of approximately the width of the tread used on corresponding high pressure tires. In the latter case the tread wear is uniform due probably to the concentration of the load on a smaller tread area. This type of tread however places an undue strain on the carcass and tread at the shoulders as indicated by the arrows in Figure 3.

In my improved construction I avoid the above objections and secure uniform tread wear, a proper distribution of the load to the carcass, and more uniform flexing of the carcass at points designed to sustain such action.

Referring to Figure 1, which shows my improved construction, 1 designates the tire carcass which may be of any suitable construction as regards type of fabric and number of plies, etc.,-2 designates the tread, 3 the side wall rubber and 4 a reinforcement between the tread and carcass. It will be understood that this reinforcement 4 may take any approved form, such as breaker and cushion strips and may be of any suitable width and thickness, the illustration in this regard being merely diagrammatic.

According to my invention the width of the tread "$a$" is made such that the edges of the tread will not overhang the rim "$g$" upon which the tire is mounted, in other words the width "$a$" is less than the maximum width of the tire rim, and where the words "narrow tread" are hereinafter used in the specification and claim a width as thus defined is intended. In the embodiment shown in the drawings the tread is confined to a width such that the tread edges come substantially above the bearing areas $h$ of the rim flanges. I form the tread "flat" that is with a radius "$r$" substantially in excess of the radius of curvature of the underlying casing. This term is well known in the art and needs no further definition. I provide the tread with a groove "$b$" running peripherally around the center of the tread, thus making the central portion the most flexible part of the tread. The tread may be provided on either side of groove "$b$" with any desired tread design as indicated at 5. I carry the shoulders of the tread "$c$" to the side wall on lines $f$—$e$ tangent to the curve of the casing, thus placing the maximum tread thickness $i$ at the tread edges.

Under load, as the tread surface flattens, the groove "$b$" permits the tread rubber to yield inwardly, to tend to close the groove, slightly flexing the underlying carcass rather than transmitting this stress to the edges of the carcass, and permitting each half of the tread to move relatively independently when obstructions are encountered. The tangent tread shoulders carry the load, thus distributed, to the sides of the casing and along rather than across the plies. The point of maximum flexture is thus moved downwardly and located in the side walls which are designed to withstand such action.

I claim:

A low pressure pneumatic tire casing having a flat tread, the edges of which are substantially vertically above the bearing areas of the flanges of the rim on which it is to be mounted, the tread being of maximum flexibility at the center and having its maximum thickness above the bearing areas of the rim flanges, the tread shoulders extending from the tread edges to the side wall of the casing on lines substantially tangent to the curve of the latter.

In testimony whereof I have signed my name to the above specification.

ELMER E. DEARTH.

CERTIFICATE OF CORRECTION.

Patent No. 1,727,537. Granted September 10, 1929,

ELMER E. DEARTH.

It is hereby certified that error appears in the above numbered patent requiring correction as follows: In the drawing, Figure 1, should appear as shown below instead of as shown in the drawing:

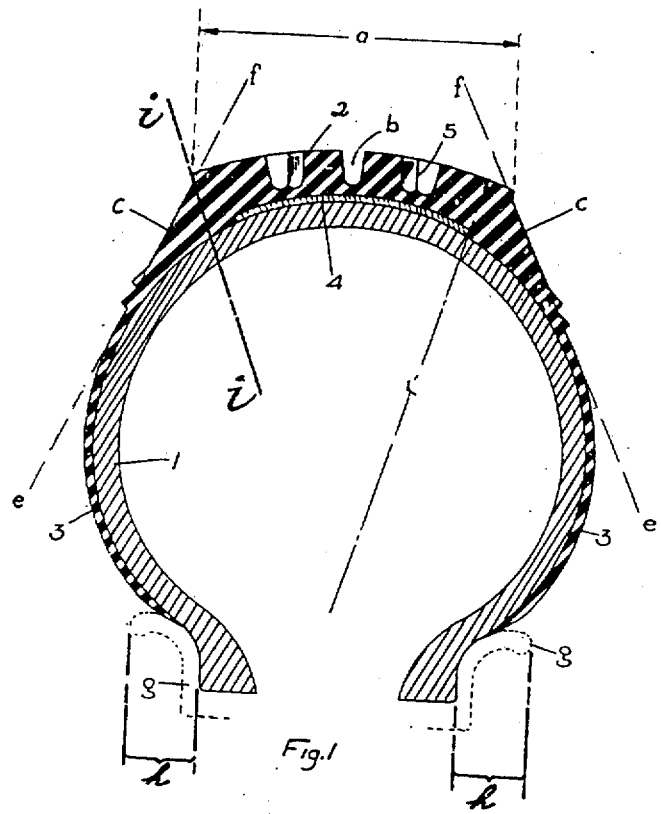

and that the said Letters Patent should be read with this correction therein that the same may conform to the record of the case in the Patent Office.

Signed and sealed this 5th day of August, A. D. 1930.

(Seal)

Wm. A. Kinnan,

Acting Commissioner of Patents.